April 2, 1968     O. R. SHOWALTER, JR     3,376,016

METHOD AND DEVICE FOR SETTING VALVES IN IRRIGATION PIPES

Filed Nov. 25, 1964

ONSLOW R. SHOWALTER, JR.
INVENTOR

Huebner & Worrel
ATTORNEYS

United States Patent Office 3,376,016
Patented Apr. 2, 1968

3,376,016
METHOD AND DEVICE FOR SETTING VALVES IN IRRIGATION PIPES
Onslow R. Showalter, Jr., 6459 Kings Canyon, Fresno, Calif. 93702
Filed Nov. 25, 1964, Ser. No. 413,829
6 Claims. (Cl. 251—359)

ABSTRACT OF THE DISCLOSURE

A device for holding a valve in adjusted position within an elongated pipe while affixing the valve to the pipe by pouring a constraining wall of cementitious material thereabout providing a support member having a portion supporting the valve and a radially extended flange supporting said cementitious material and having a peripheral edge resiliently frictionally engageable with the inner surface of the pipe.

---

When assembling a fluid control valve in a section of irrigation pipe at the manufacturing plant, it is conventional practice to stand the pipe on one end and fill the pipe with sand to a predetermined level corresponding to the desired location of the valve therein. During such filling of the pipe the sand is continually tamped to provide a firm base and support for the valve which is placed on the upper surface of the sand and in substantially concentric relation with the inner periphery of the pipe. A predetermined quantity of a thin mixture of cementitious material is poured on the upper surface of the sand around the valve. Such material is permitted to cure to provide a support wall between the valve and the inside periphery of the pipe.

After curing, the sand must be removed. Inasmuch as the sand filled pipe may weigh several hundred pounds, a suitable tension member is connected to the valve and the pipe is lifted by any suitable lifting device such as a fork truck or the like for removal of the sand. After being compressed so tightly the sand usually adheres to the inner periphery of the pipe so that it must be removed by manual prodding with a suitable tool. With increasing labor costs, the use of sand as a valve support has become economically prohibitive.

Frequently the valves are installed in irrigation pipes in the field. In such installation it is impossible to employ sand as a supporting medium for a valve as previously described in the setting procedure employed at the factory. The conventional practice in such field installation is to supply a valve having an integral flange providing a plurality of lugs radially extended therefrom at circumferentially spaced locations. The valve is then merely wedged into place within the pipe and the mortar or other cemetitious material poured on top of the flange about the valve. As a result the valve is only supported by a frictional contact of the lugs with the inside periphery of the pipe and the adhesive characteristics of the cementitious material. This arrangement provides no support from beneath the valve. Also, such procedure has not been satisfactory in that frequently the inside periphery of the pipe may vary as much as three-eights (⅜) of an inch in new pipe, and even more in older pipe which has become worn by use. The arrangement also leaves gaps between the valve flange and the wall of the pipe permitting seepage of the uncured cementitious material past the valve. Only a thin layer of cementitious material remains so that the valve is easily dislodged by shock forces imposed by animals or the like from above the ground. If such damage occurs, the valve frequently drops within the irrigation pipe to a position restricting or completely stopping the flow of irrigation fluid therethrough.

Accordingly, it is an object of the present invention to provide an improved method and device for setting valves in irrigation pipes.

Another object is to provide such an improved valve setting device which is adapted for either field or factory assembly and valve setting.

Another object is to provide a valve setting device which may be left in assembly during use of the irrigation pipe without affecting valve operation.

Another object is to provide a valve setting device which easily accommodates wide variations in pipe size.

Another object is to provide a valve setting device which is capable of supporting the valve in the pipe in fluid-tight relation.

Another object is to provide a valve setting device which is convenient in use and more economical than existing practices.

Other objects and advantages of the present invention will be more fully apparent in the following description in the specification.

Figure 1:
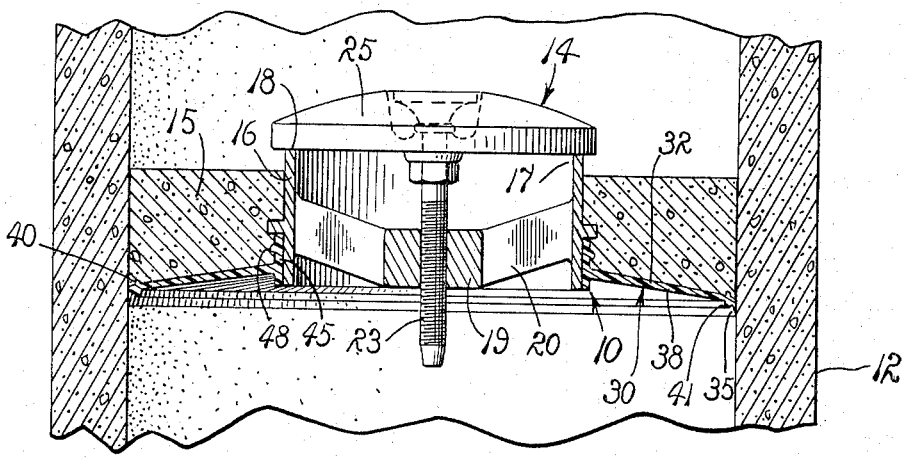
FIG. 1 is a central vertical section through the valve setting device embodying the principles of the present invention shown mounted within the upper end of an irrigation standpipe.

Referring more particularly to the drawings, the valve setting device of the present invention is generally indicated by the reference numeral 10. As best shown in FIG. 1 the valve setting device is utilized in connection with a conventional concrete standpipe 12 conventionally employed in low pressure irrigation systems. Further, a fluid flow valve 14 is mounted in the upper end of the standpipe by a wall 15 of cementitious material, such as a mortar prepared from a sand and Portland cement mixture.

The valve 14 provides an annular housing or valve body 16 which defines an upper discharge opening 17 substantially circular in plan view and circumscribed by an annular valve seat 18. A boss 19 is supported centrally of the discharge opening by a plurality of radially extended struts 20. The boss screwthreadably mounts an elongated control bolt 23 rotatably connected in axially constrained relation to a cover plate 25 for the housing. The precise structure and operation of the valve 14 is more fully described in my co-pending application Ser. No. 269,570 entitled "Fluid Flow Control Valve" filed Apr. 1, 1963.

Figure 2:
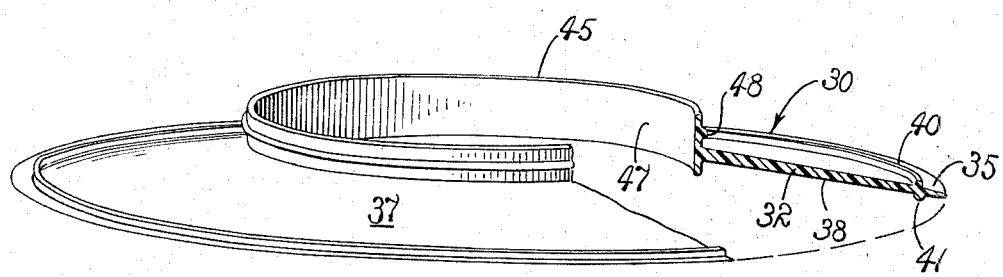
FIG. 2 is a somewhat enlarged perspective view of the valve setting device of FIG. 1 with portions broken away for illustrative convenience.

As best shown in FIG. 2 the valve setting device 10 of the present invention provides an annular valve support ring 30 preferably composed of a pliable inert material such as polytetrafluorethylene or like substances having similar chemical and physical properties. The ring has a radially outwardly tapering annular wall portion 32 which, as best shown in FIG. 1, is substantially frustoconical in cross section to enhance the weight carrying potential of the wall.

The wall terminates in an integral outer peripherally extended annular edge or fin 35. The fin has a transverse dimension substantially less than the wall 32 so as to be readily flexed relative to the substantially stiffer wall. The wall presents an upper surface 37 and a lower surface 38 which individually provide integrally formed beads 40 and 41, respectively, adjacent to the fin for added strength. The lower bead also serves as a sealing member when disposed against the inner periphery of the standpipe 12. The ring further includes a centrally disposed axially extended annular flange 45 circumscribing an opening 47 through the ring. An annular bead 48 is formed around the flange above the upper surface 37 of the wall 32 for added strength and to present an irregular gripping surface for the cementitious wall 15. Consequently, when the cementitious material of wall 15 is cured, a mechanical lock between the wall and the valve setting device 10 is provided.

Operation

Figure 3:
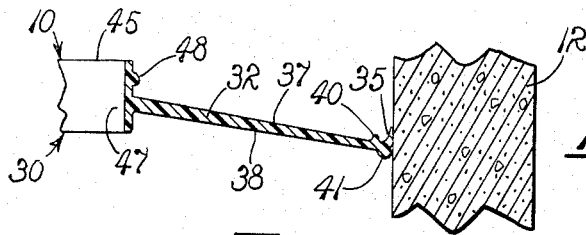
FIG. 3 is a fragmentary vertical section through the valve setting device disposed in one position within the standpipe.

The operation of the described embodiment of the subject invention is believed to be clearly apparent and is briefly summarized at this point. When it is desired to install the valve 14 in the standpipe 12, the valve setting device 10 of the present invention is axially inserted into the standpipe 12. As best shown in FIG. 3, during such axial positioning, the fin 35 of the ring 30 is folded upwardly by frictional contact with the inner periphery of the standpipe. It is noted that the fin readily accommodates for any irregularities of the inner periphery of the standpipe.

When inserted in the position shown in FIG. 3, the lower bead 41 of the ring is tightly pressed against inner periphery of the standpipe in substantially fluid-tight sealing relation. However, in field installations, fin 35 can accommodate a larger size standpipe which has been worn by water erosion. Also if the ring 30 is placed too far within the standpipe the direction of movement of the ring can be reversed as shown in FIG. 4 wherein the fin is folded downwardly in similar sealing relation.

Figure 4:
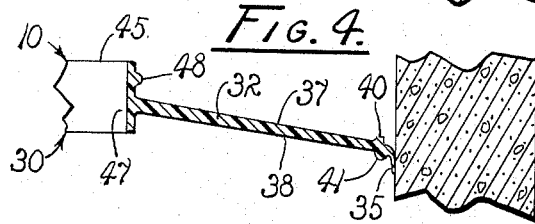
FIG. 4 is a fragmentary vertical section through the valve setting device shown in an alternative position within the standpipe.

With the ring disposed in either of the tightly wedged positions of FIGS. 3 and 4 the frusto-conical wall 32 thereof dependably supports the central flange 45 in substantially concentric relation within the standpipe 12. The valve 14 is then inserted into the opening 36 in the wall 32 with the flange body 16 thereof rested against the upper surface of the flange 45 of the ring 30. A predetermined quantity of cementitious material in a flowable plastic state is poured upon the upper surface 37 of the ring in circumscribing relation to the valve to form the wall 15.

With the above described sealing effect of the fin 35 there is substantially no seepage of the plastic cementitious material past the valve 14. Furthermore in field installations the valve setting ring 30 effectively protects the cementitious material from any fluid which may be within the standpipe while the cementitious material is curing.

After complete curing of the cementitious material, the cover plate 25 may be opened for valve operation and flow of fluid therethrough. The ring 30 remains in place within the standpipe without affecting valve operation. Even if subsequent deterioration of the cementitious material in the wall 15 occurs, the ring 30 is still in place to permit patching of the material constraining the valve without altering the position of the valve within the standpipe. Also, when the ring is used in factory operations, the assembled unit is easily handled by a single workman without the need of mechanical lifting devices as required with the sand technique previously employed.

In view of the foregoing, it is readily apparent that the present invention provides an improved valve setting device which may be employed with equal utility for both factory and field setting operations. The setting device is easily installed in fluid-tight sealing relation in pipes having wide variations in size and remains in assembled position during use of the pipe without impairing valve operation. As a result of its inherent advantages, this device has greatly simplified the heretofore tedious valve setting operations which can now be accomplished at a fraction of the former costs.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A valve setting device, adapted to be disposed within an elongated irrigation pipe for holding a valve in predetermined axial position while pouring a constraining wall of cementitious material thereabout, comprising a support member having a peripheral edge disposed at a distance greater than the inside dimension of the pipe, the edge having a flexible portion deformable during axial movement of the member within the pipe for frictional engagement with the inner surface of the pipe in substantially fluid-tight sealing relation, the support member including a substantially stiffer portion inwardly of the edge providing an opening therethrough to receive the valve with the member constraining a predetermined level of such cementitious material around the valve.

2. A valve setting device, adapted to be disposed within an elongated irrigation pipe for holding a valve in predetermined position while pouring a constraining wall of cementitious material thereabout, comprising a support member having a peripheral edge disposed at a distance greater than the inside dimension of the pipe, the edge having a flexible portion deformable during axial movement of the member within the pipe frictionally to engage the inside of the pipe in substantially fluid-tight sealing relation, and the support member including a substantially stiffer portion inwardly of the edge providing a continuous axially extended flange circumscribing an opening through the member to receive the valve in supporting relation within the pipe with the member constraining a predetermined level of such cementitious material thereupon in circumscribing relation to the valve.

3. A valve setting device, adapted to be disposed within an elongated irrigation pipe for holding a valve in predetermined position while pouring a constraining wall of cementitious material thereabout, comprising a substantially circular ring of a diameter larger than the inside diameter of the pipe and having a continuous flexible peripheral edge portion deformable in either direction of axial movement during placement within the pipe to a position frictionally to engage the inner periphery of the pipe and including an integral annular bead spaced inwardly concentrically of the edge portion engaging the inner periphery of the pipe in substantially fluid-tight sealing relation, said ring including a substantially stiffer portion inwardly of the bead providing an opening therethrough to receive the valve with the ring constraining a predetermined level of such cementitious material around the valve.

4. A valve setting device, adapted to be disposed within an elongated irrigation pipe for holding a valve in predetermined position while pouring a constraining wall of cementitious material thereabout, comprising a substantially circular ring of a diameter somewhat larger than the inside diameter of the pipe having a continuous flexible peripheral edge portion deformable in either direction of axial movement during placement within the pipe to a position frictionally to engage the inner periphery of the pipe and including an integral annular bead spaced inwardly concentrically of the edge portion engaging the inner periphery of the pipe in substantially fluid-tight sealing relation, said ring including a substantially stiffer portion inwardly of the bead providing a continuous axially extended flange circumscribing an opening through the ring to receive the valve in supporting relation within the pipe with the ring constraining a predetermined level of such cementitious material thereupon in circumscribing relation to the valve.

5. A valve setting device, adapted to be disposed within an elongated irrigation pipe for holding a fluid control valve in predetermined position within the pipe while pouring a valve constraining wall of cementitious material around the valve, comprising a substantially circular support ring providing a frusto-conical wall of a diameter somewhat larger than the inside diameter of such a pipe, having a flexible peripheral edge portion deformable in either axial direction during placement within the pipe and including an integral annular bead concentric with said edge porton to engage the inside of the pipe in at least one direction of axial movement in substantially fluid-tight sealing relation, said wall including a centrally disposed axially extended flange in concentric relation to said edge portion and the bead circumscribing an opening through the wall to receive the valve in supporting relation within the pipe with the wall constraining a predetermined level of such cementitious material around the flange and the valve in interconnecting relation between the pipe and the valve.

6. A device for holding an object in adjusted position in an elongated pipe while affixing the object to the pipe comprising a support member circumscribing the object having a portion supporting the object, and a radially extended circumscribing substantially rigid flange portion, said flange portion having a peripheral edge resiliently frictionally engageable with the inner surface of the pipe.

References Cited

UNITED STATES PATENTS

| | | | |
|---|---|---|---|
| 972,384 | 10/1910 | Kellar et al. | 137—321 |
| 2,051,919 | 8/1936 | Tow | 137—321 |
| 2,646,076 | 7/1953 | Bonander et al. | 251—147 |
| 2,768,642 | 10/1956 | Sherman et al. | 137—321 |
| 3,043,329 | 7/1962 | Helweg | 137—321 |
| 3,107,895 | 10/1963 | Vogeli | 251—359 |

M. CARY NELSON, *Primary Examiner.*

S. SCOTT, *Assistant Examiner.*